US008898263B2

(12) United States Patent  
Bharadwaj Subramanya (10) Patent No.: US 8,898,263 B2  
(45) Date of Patent: Nov. 25, 2014

(54) DETECTING CHANGE OF SETTINGS STORED ON A REMOTE SERVER BY MAKING USE OF A NETWORK FILTER DRIVER

(75) Inventor: Manjunath Bharadwaj Subramanya, Bangalore (IN)

(73) Assignee: Autonomy Inc., San Francisco, CA (US)

( * ) Notice: Subject to any disclaimer, the term of this patent is extended or adjusted under 35 U.S.C. 154(b) by 389 days.

(21) Appl. No.: 13/114,459

(22) Filed: May 24, 2011

(65) Prior Publication Data

US 2012/0303771 A1 Nov. 29, 2012

(51) Int. Cl.
G06F 15/177 (2006.01)
G06F 15/16 (2006.01)
H04L 12/64 (2006.01)
H04L 29/08 (2006.01)
G06F 11/14 (2006.01)
H04L 29/14 (2006.01)
G06F 11/34 (2006.01)
H04L 29/06 (2006.01)

(52) U.S. Cl.
CPC ............ *H04L 67/02* (2013.01); *G06F 11/3495* (2013.01); *H04L 12/6418* (2013.01); *H04L 67/1097* (2013.01); *G06F 11/1464* (2013.01); H04L 63/0227 (2013.01); *H04L 69/40* (2013.01); H04L 63/1408 (2013.01)
USPC ........... 709/221; 709/220; 709/222; 709/223; 709/224; 709/225; 709/226

(58) Field of Classification Search
USPC ................................................ 709/220–226
See application file for complete search history.

(56) References Cited

U.S. PATENT DOCUMENTS 7,222,194 B2 * 5/2007 Kano et al. ..................... 709/248
7,529,811 B2 * 5/2009 Thompson .................... 709/219
2003/0208750 A1 * 11/2003 Tapper et al. ................. 717/177
2004/0044707 A1 * 3/2004 Richard ........................ 707/204
2004/0225877 A1 * 11/2004 Huang .......................... 713/100
2005/0188080 A1 * 8/2005 Motsinger et al. ........... 709/224
2006/0143158 A1 * 6/2006 Ruhl et al. ........................ 707/3
2007/0016676 A1 * 1/2007 Breuer et al. ................ 709/225
2007/0255818 A1 * 11/2007 Tanzer et al. ................ 709/224
2008/0021889 A1 * 1/2008 Nam et al. ....................... 707/3
2008/0034425 A1 * 2/2008 Overcash et al. .............. 726/22
2010/0228836 A1 * 9/2010 Lehtovirta et al. ........... 709/220
2010/0235918 A1 * 9/2010 Mizrahi et al. ................ 726/25
2011/0302280 A1 * 12/2011 McJilton et al. ............. 709/220
2012/0255017 A1 * 10/2012 Sallam ........................... 726/24

FOREIGN PATENT DOCUMENTS

WO WO 2010002407 A1 * 1/2010

* cited by examiner

*Primary Examiner* — Nicholas Jensen
*Assistant Examiner* — Berhanu Belete (57) ABSTRACT

Embodiments relate to techniques for efficiently and effectively propagating changes from a server to a client using a network filter driver configured to monitor network traffic for a signature. Techniques are presented for synchronizing settings with a remote server device. A method is provided, including (a) monitoring web-based messages exchanged between the computerized client device and the remote server device across a network, (b) detecting a pre-defined pattern within a particular message of the monitored web-based messages exchanged between the computerized client device and the remote server device, (c) in response to detecting the pre-defined pattern within the particular message, evaluating the particular message to determine whether a set of server settings has changed, and (d) in response to determining that the set of server settings has changed, updating a local version of the set of server settings. A corresponding apparatus and computer program product are also provided.

20 Claims, 6 Drawing Sheets

DETECTING CHANGE OF SETTINGS STORED ON A REMOTE SERVER BY MAKING USE OF A NETWORK FILTER DRIVER

BACKGROUND

A conventional remote backup system includes client computers (sources of information to backup) and a remote backup facility. Each client computer typically runs a backup agent which coordinates aspects of the backup process (e.g., start times, what locations to backup to the remote backup facility, etc.) based on backup settings which are locally stored within both the client computer and the remote backup facility.

When a user of a client computer wishes to make a change to the backup settings, the user logs into a website of the remote backup facility and saves the change at the remote backup facility. The remote backup facility then communicates the change to the backup agent running on the client computer.

One approach to communicating the change from the remote backup facility to the client computer involves the client computer maintaining an open connection with the remote backup facility, allowing the remote backup facility to communicate the changes to the client computer over the open connection as soon as the changes are made. Another approach to communicating the change from the remote backup facility to the client computer involves the client computer opening a new connection to the remote backup facility at periodic intervals and querying the remote backup facility for changes. In some systems, the periodic intervals are short intervals, on the order of five seconds between connections. In other systems, the periodic intervals are long intervals, on the order of one day between connections.

SUMMARY

Unfortunately, there are deficiencies to the above-described conventional approaches to communicating a settings change from a remote backup facility to a client computer. For example, the conventional constant open connection approach consumes computer resources on both the remote backup facility and the client computers in order to maintain the open connections even when settings changes are made infrequently. Additionally, the conventional short interval approach consumes processor resources and produces frequent network traffic each time a client computer creates a new connection to query the remote backup facility for settings changes. Furthermore, the conventional long interval approach suffers from potentially long latencies in propagating settings changes from the remote backup facility to the client computers (e.g., it may take several hours for a client computer to become aware of a settings change if the client computer checks with the remote backup facility only on a nightly basis).

Improved techniques involve the use of a pre-defined pattern which is detectable within messages exchanged between a computerized client device and a remote server over a network. In particular, when the computerized client device detects the pre-defined pattern within a message, the computerized client device automatically evaluates whether a settings change has occurred at the remote server. In some arrangements, a network filter driver of the computerized client device (i) monitors messages (e.g., packets, collections of contiguous packets that form a coherent application-level message, etc.) for a web-based signature (e.g., a particular URL string or subset thereof), and (ii) activates a settings evaluation routine of a backup agent running on the computerized client device when the network filter driver detects that web-based signature. Such operation alleviates the need to maintain an open connection between the computerized client device and the server. Additionally, such operation alleviates the need for the computerized client device to periodically establish a new connection the server.

In particular, in one embodiment, techniques are presented for synchronizing settings with a remote server device. A method is provided, including (a) monitoring web-based messages exchanged between the computerized client device and the remote server device across a network, (b) detecting a pre-defined pattern within a particular message of the monitored web-based messages exchanged between the computerized client device and the remote server device, (c) in response to detecting the pre-defined pattern within the particular message, evaluating the particular message to determine whether a set of server settings has changed, and (d) in response to determining that the set of server settings has changed, updating a local version of the set of server settings. An apparatus client device is also provided for performing a similar method, as is a computer program product configured to perform a similar method.

In addition, techniques are presented for, in a computerized client device, receiving a command from a remote server device. A method is provided including (a) at a network filter driver of a network driver stack, monitoring web-based messages exchanged between a web browser running on the computerized client device and a web server running on the remote server device across a network, (b) at the network filter driver, detecting a pre-defined pattern followed by a control string within a particular message of the monitored web-based messages exchanged between the web browser and the web server, and (c) in response to detecting the pre-defined pattern followed by the control string within the particular message, sending a command from the network filter driver to a local service running on the computerized client device, the command including the control string as a parameter.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Embodiments of the present disclosure relate to techniques for propagating changes from a server device to a client device without long latency periods and without unnecessarily wasting system and network resources by monitoring network traffic for a signature pattern. Embodiments involve the use of a pre-defined pattern which is detectable within messages exchanged between a computerized client device and a remote server over a network. In particular, when the computerized client device detects the pre-defined pattern within a message, the computerized client device automatically evaluates whether a settings change has occurred at the remote server. In some arrangements, a network filter driver of the computerized client device (i) monitors messages (e.g., packets, collections of contiguous packets that form a coherent application-level message, etc.) for a web-based signature (e.g., a particular URL string or subset thereof), and (ii) activates a settings evaluation routine of a backup agent running on the computerized client device when the network filter driver detects that web-based signature. Such operation alleviates the need to maintain an open connection between the computerized client device and the server. Additionally, such operation alleviates the need for the computerized client device to periodically establish a new connection the server.

Figure 1:
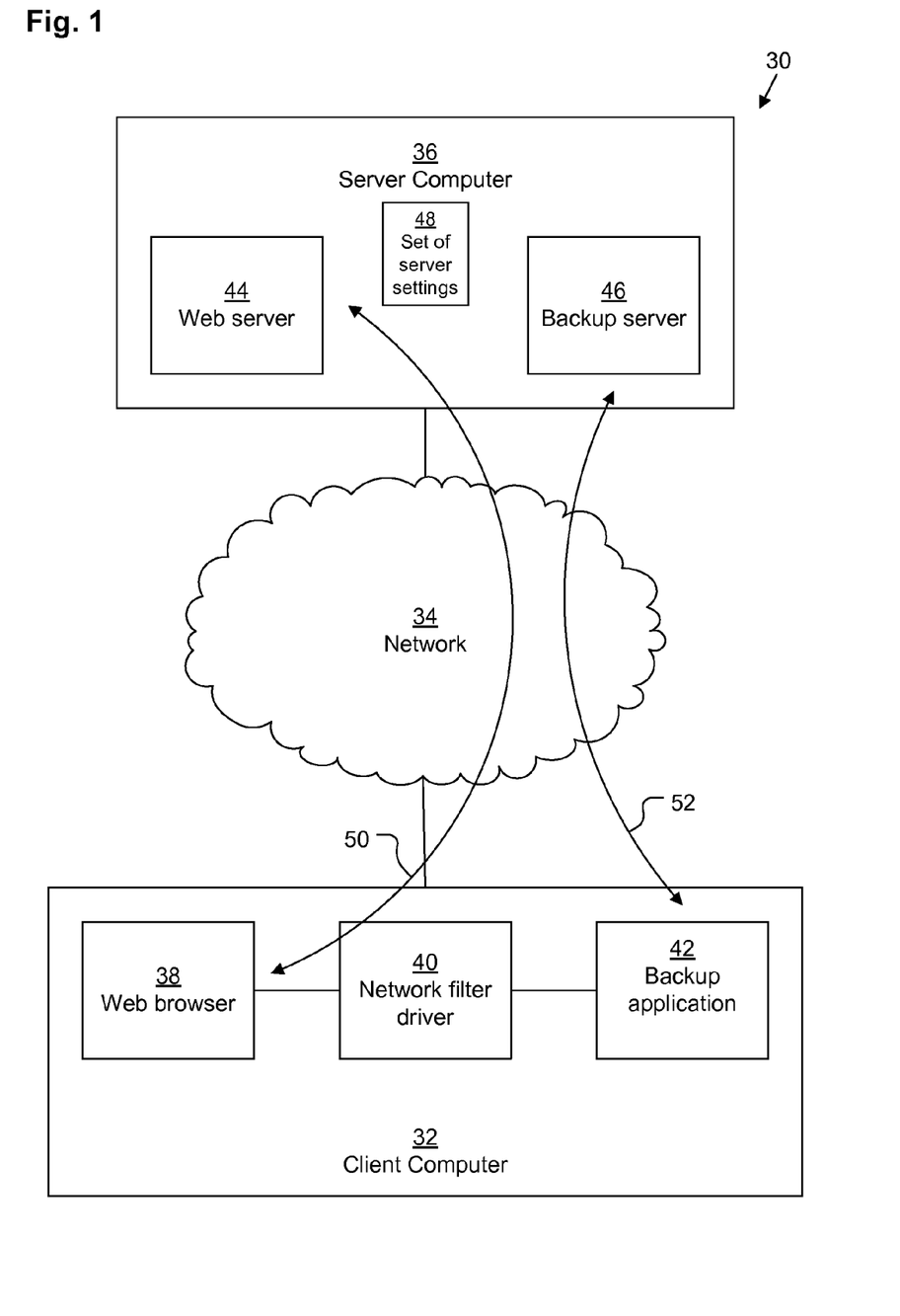
FIG. 1 illustrates an example system for use in connection with various embodiments.

FIG. 1 depicts an example client/server system 30 for use in connection with various embodiments. In some embodiment, system 30 may be a backup system, while in other embodiments, system 30 may be another type of client/server system, such as, for example, a file distribution network.

System 30 includes a client computer 32 and a server computer 36, connected by a network 34. It should be understood that network 34 may be any sort of connection medium capable of connecting client and server computers 32, 36, such as a packet-switched network, a local area network, a wide area network, a storage area network, the Internet, a circuit-switched network, a fabric of interconnected cables and/or wires, a wireless network, a cellular network, or a point-to-point connection. It should further be understood that a single client computer 32 and a single server computer 36 are shown by way of example only. In some arrangements, system 30 may include a plurality of client computers 32 and/or a plurality of server computers 36. It should also be understood that the client computer 32 (hereinafter referred to as client 32) and the server computer 36 (hereinafter referred to as server 36) may be any sort of computerized devices, such as a computer, a terminal, a smart phone, etc.

Operating on client 32 is a web browser 38, a network filter driver 40, and a backup application 42. It should be understood that the backup application 42 is depicted by way of example only. In some embodiments, another locally-running system service may take its place. Further detail with respect to client 32 is provided below, in connection with FIG. 2.

Operating on server 36 is a web server 44 and a backup server application 46. Server 36 also stores a set of server settings 48. It should be understood that the backup server application 46 is depicted by way of example only. In some embodiments, another server application may take its place. In some embodiments, web server 44 and backup server 46 execute on separate server machines in communication with each other over the network, both web server 44 and backup server 46 having access to the set of server settings 48.

In operation, web browser 38 communicates with web server 44 across network 34 over a web-based connection 50, such as, for example, a hypertext transfer protocol (HTTP) connection or an HTTP secure (HTTPS) connection. Web-based connection 50 passes through network filter driver 40, which is configured to monitor some or all communications passing through it over the a web-based connection 50. Backup application 42 may also communicate with backup server 46 across network 34 over connection 52. Connection 52 may be a non-persistent communication channel that is opened on an as-needed basis. It may operate, for example, according to the SOAP protocol, version 1.2, whose specification was published by the W3C organization on Apr. 27, 2007. It may also operate according to an earlier or later version of that protocol, or according to any other protocol suitable for exchanging structured information in the implementation of Web Services in computer networks.

Further detail with respect to the operation of web browser 38, network filter driver 40, backup application 42, web server 44, and backup server 46 is provided below, in connection with FIGS. 3-6.

Figure 2:
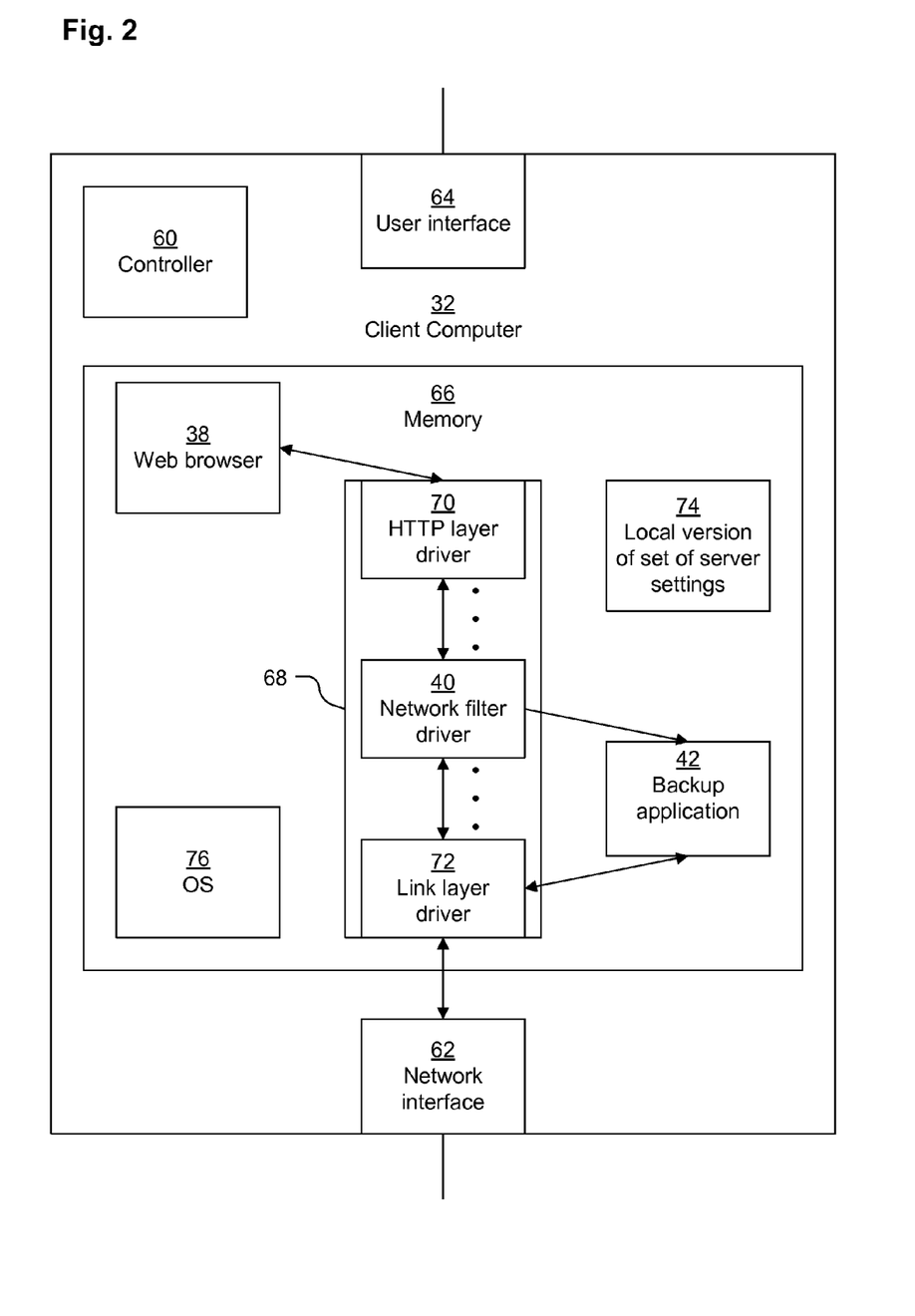
FIG. 2 illustrates an example apparatus according to various embodiments.

FIG. 2 depicts an example client 32 according to one embodiment in further detail.

Client 32 includes a controller 60, a network interface 62, a user interface 64, and memory 66. Controller 60 may be a processor, a microprocessor, a central processing unit, an integrated circuit, a collection of integrated circuits, a set of processing circuitry, a field programmable gate array, a signal processor, similar elements, or some combination thereof.

In some embodiments, controller 60 is a general purpose processor configured to execute operations stored in software programs contained within memory 66. In connection with these embodiments, it should be understood that, within this document, any time a piece of software contained within memory 66 is described as performing a particular task or operation, that is mere shorthand for performance of the particular task or operation by the controller 60 executing code contained within that piece of software.

In other embodiments, controller 60 includes a set of processing circuitry that may be configured to perform operations directly in its hardware design as a pipeline of connected modules each having specifically-designed operations. In connection with these embodiments, it should be understood that, within this document, any time a piece of software contained within memory 66 is described as performing a particular task or operation, that is mere shorthand for performance of the particular task or operation by an appropriate circuitry module of the controller 60.

Network interface 62 is a hardware device that is configured to connect client 32 to network 34 so that communications can be carried out across the network 34, such as between client 32 and server 36. It should be understood that network interface 62 may have one or more connections to network 34 and that network interface 62 may connect to other networks in addition to network 32.

User interface 64 is a hardware interface that is configured to connect to various user interface devices (not depicted) that allow for communication between a human user and the client device 32 by receiving user input and/or by providing information to the user. Examples of user interface devices that may connect to user interface 64 may include, for example, a display, a monitor, a television, a cathode ray tube, a liquid crystal display, a plasma display, a light-emitting diode display, a keyboard, a keypad, a mouse, a tracking pad, a tracking stick, a tracking ball, a touch screen, a biometric device, a joystick, a printer, a plotter, a projection screen, similar devices, or some combination thereof.

Memory 66 may be any kind of digital memory, such as for example, system memory, cache memory, volatile memory, random access memory, read-only memory, static memory, programmable read-only memory, flash memory, magnetic disk-based storage, optical disk-based storage, a hard disk, a floppy disk, a compact disc, a digital versatile disc, a blu-ray disc, similar devices, or some combination thereof. Typically memory 66 will include high-speed volatile system memory for storage of executing programs and data as well as lower-speed non-volatile long-term storage for permanent storage of programs.

Memory 66 stores web browser 38, backup application 42 (or another locally operating system service), network driver stack 68, and operating system 76 for execution by controller 60. Memory 66 also stores a local version 74 of the set of server settings 48. Memory 66 may also store additional data and executing programs as well as user files.

Typically, during operation, web browser 38 executes to display web pages received from web server 44 to a user via user interface 64. The user may input, via user interface 64, a request to see a web page. When the web browser 38 receives such a request, it sends an HTTP (or an HTTPS) request to web server across network 34 by sending the request to network driver stack 68 for transmission to network interface 62. Network driver stack 68 may include a plurality of layers. Web browser 38 typically interacts with HTTP layer driver 70, which then passes on a command to a lower layer in the network driver stack. At an intermediate stage of the network driver stack 68, network filter driver 40 receives a command, which it then passes on to a lower layer in the network driver stack. At a lowest stage of the network driver stack 68, link layer driver 72 receives a command, which it then passes on to the network interface for transmission over the network 34. Link layer driver 72 may be, for example, an Ethernet driver, a Token Ring driver, a Fibre Channel driver, etc. It should be understood that a plurality of additional drivers (not depicted) may interpose between HTTP layer driver 70 and network filter driver 40 and between network filter driver 40 and link layer driver 72. These additional drivers may include, for example, various well-known application-layer, transport layer, and internet layer drivers. When web server 44 sends an HTTP response, such as a web page to web browser 38 across network 34, the response may traverse a similar path in reverse, going from web server 44 to network 34 to network interface 62 to network driver stack 68 (traversing the network stack in reverse order, going from link layer driver 72 up to network filter driver 40 up to HTTP layer driver 70, possibly additionally passing through the additional drivers as well) to web browser 38, typically so that it may be displayed on a display screen via user interface 64.

Figure 3:
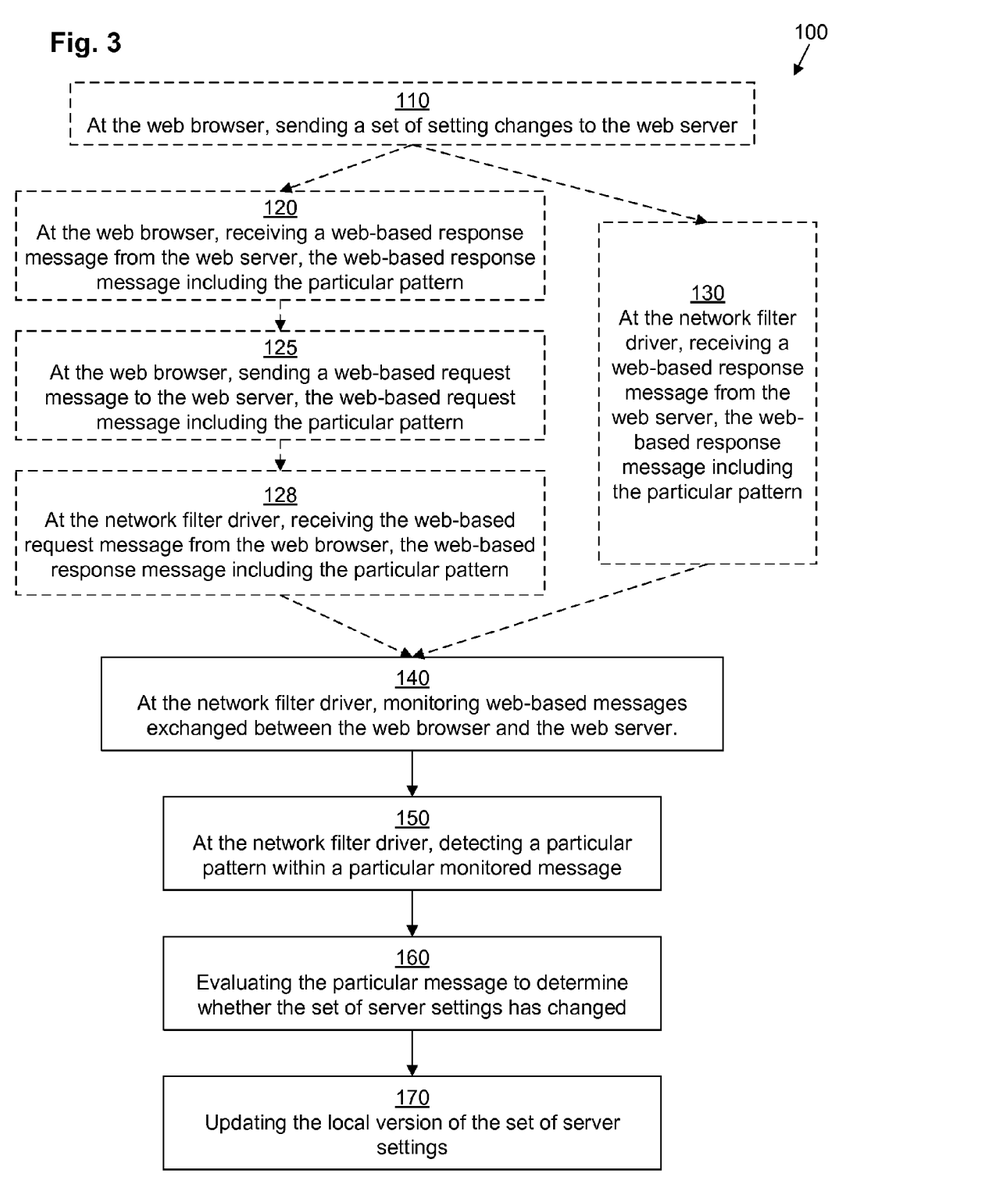
FIG. 3 illustrates an example method of various embodiments.

The system 30 as described (as well as various other similar systems) is suitable to perform various methods, such as for example, method 100, depicted in FIG. 3.

FIG. 3 depicts an example method 100 according to various embodiments. Method 100 includes optional steps 110-130, followed by steps 140-170, as depicted. It should be understood that, although various software components are described as performing various of the steps of method 100 (meaning that a processor performs these steps via execution of code contained within that software), this is by way of example only. In fact, in some embodiments, the steps of method 100 are actually performed in dedicated hardware, while, in other embodiments, the steps are performed within different modules than as described.

In step 110, web browser 38 sends a set of settings changes to the web server 44. It should be understood, in connection with timing diagram 200 depicted in FIG. 4, that step 110 is typically accomplished by web browser 38 first sending a request 202 for a settings update form page 204 from web server 44. Upon receiving the settings update form page 204 from web server 44, the settings update form page 204 typically including a list of the current set of server settings 48 as well as form fields in order for the user to enter new or changed values for one or more of the settings, the user may enter the appropriate new settings and then submit the form to the web server 44 in order to update the settings. The web browser 38 may execute this submission by transmitting a web request 206 to the web server 44 containing values from the form entered by the user. This web request may be made in the form of a standard HTTP (it should be understood that, unless specified otherwise, HTTPS may always be used interchangeably with HTTP) Post request or it may be made by issuing a standard Get request with values passed as variables within a Uniform Resource Identifier (URI) field or a similar type of address field.

The server settings at issue may be any sort of settings. In one embodiment, the server settings may be client-specific settings used by server 36 and client 32. In one embodiment, the server settings may be used by backup server 46 and backup application 42 to control operation of backup operations interchanged between backup server 46 and backup application 42. In this embodiment, the settings may include one or more of the following: a choice of what files stored on client 32 to backup; a choice of what folders stored on client 32 to backup; a choice of what devices connected to client 32 to backup; a choice of what devices connected to client 32 to exclude from backup; a choice of what folders stored on client 32 to exclude from backup; a choice of what files stored on client 32 to exclude from backup; a choice of when to perform periodic backups of client 32; and a choice of how often to perform periodic backups of client 32.

Figure 4:
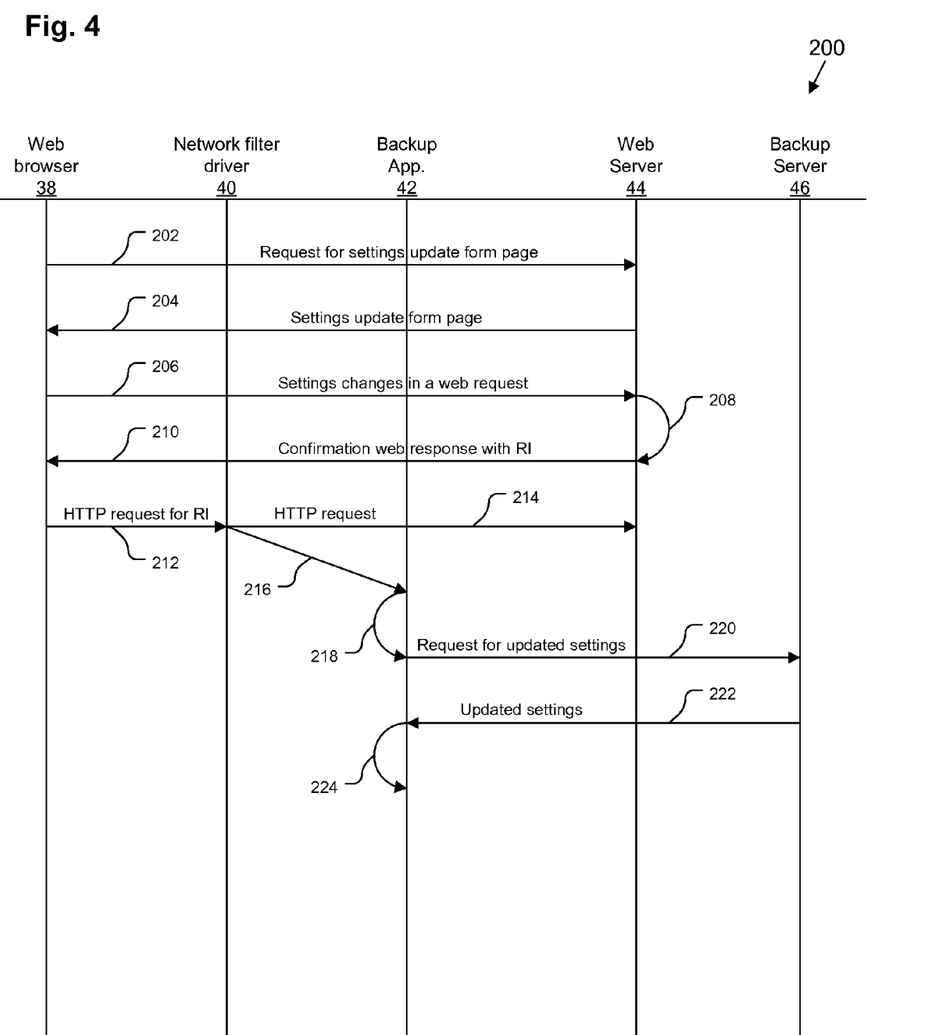
FIG. 4 illustrates an example method of various embodiments.

Upon receiving the set of settings changes (for example, in the form of web request 206) at the web server 44, web server 44 may execute various local operations 208, such as analyzing the settings changes for correctness and consistency, updating the set of server settings 48 stored on the server 36 to reflect the changes, and computing a hash value based on the new set of server settings 48, such that any reasonable modification to the set of server setting 48 would result in a different hash than before modification. In some embodiments, one or more of these local operations may be carried out by backup server 46 rather than by web server 44. Web server 44 is then able to send a web-based response message 210 to web browser 38. If the set of server setting 48 has been successfully updated, web-based response message 210 includes a particular pattern 312 (see FIG. 5), or a signature, that indicates that the settings have changed, as well as, in some embodiments, the hash value 320 (see FIG. 5 and accompanying text, below, for further detail).

In one embodiment, operation then passes on to step 120. In step 120, the web browser 38 receives the web-based response message 210 from the web server 44 (via network driver stack 68). In step 125, web browser 38 responds by sending a web-based request message 212 to the web server 44 via the network driver stack 68.

Figure 5:
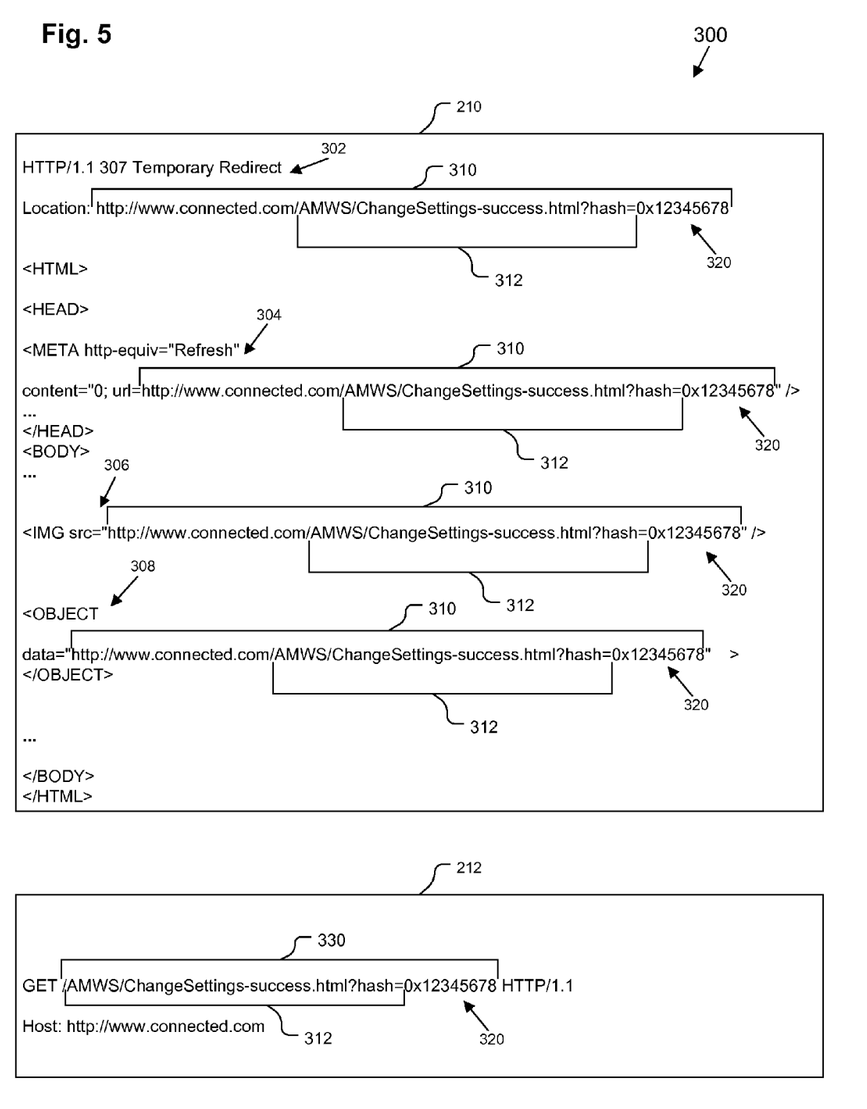
FIG. 5 illustrates an example set of back-and-forth communications for use in connection with various embodiments.

FIG. 5 depicts an example set of back-and-forth communications 300 between web server 44 and web browser 38 according to the embodiments which carry out steps 120 and 125 (see FIG. 3). The set of back-and-forth communications 300 includes web-based response message 210 and web-based request message 212. As depicted in FIG. 5, web-based response message 210 includes an HTTP response header, as is well-known in the art. In some embodiments HTTP response header includes a temporary redirect status command 302 (or, alternatively, a non-temporary redirect status command), which directs web browser 38 to immediately request a new page having a redirection URI 310. Redirection URI 310 (e.g., <http://www.connected.com/AMWS/ChangeSettings-success.html?hash=0x12345678>) includes signature pattern 312, as well as, optionally, hash value 320. In another embodiment, a similar redirection is performed not by using an HTTP redirect status command 302, but rather by using a hypertext markup language (HTML) meta http-equiv element 304 within a confirmation web page, the meta http-equiv element 304 having a redirection URI 310 with signature pattern 312 (and hash value 320), as is well-understood in the art. In yet other embodiments, instead of indicating a redirection, confirmation web page instead includes an image element 306 or object element 308, either of which is formatted to cause the web browser 38 to request an image or some type of HTML object, respectively, having redirection URI 310 with signature pattern 312 (and hash value 320).

Upon receiving web-based response message 210, web browser 38 automatically generates web-based request message 212 and sends it to the web server 44 via the network driver stack 68, as previously mentioned with respect to step 125 (see FIG. 3). Web-based request message 212 is typically an unencrypted HTTP Get request message directed to web server 44 having a request-URI 330, which also contains signature pattern 312 (and hash value 320) so that network filter driver 40 is able to properly process the signature pattern 312 (and hash value 320) in subsequent steps 140-170.

It should be understood that it is beneficial to use the approach utilizing elements 306, 308 when web-based response message 210 is transmitted using HTTPS, since redirections from HTTPS-delivered pages are typically also performed using HTTPS, yet network filter driver 40 is generally implemented at a layer of the network driver stack 68 below implementation of encryption. Therefore, since image and object elements 306, 308 can be easily formatted to cause the web browser 38 to issue unencrypted HTTP Get requests even when the web-based response message 210 is encrypted, using the image or object element 306, 308 approach allows network filter driver 40 to see the signature pattern 312 (and hash value 320) within web-based request message 212 in plaintext, which is beneficial in later steps.

After step 125, operation passes on to step 128, in which network filter driver 40 receives the web-based request message 212 from the web browser 38, the web-based request message 212 including the particular pattern 312 (and hash value 320).

In some embodiment, operation passes on to step 130 instead of steps 120-128 after performing step 110. In step 130, the network filter driver 40 receives the web-based response message 210 from the web server 44, the web-based response message 210 including the particular pattern 312 (and hash value 320). In these embodiments, the particular pattern 312 may be embedded within elements 302, 304, 306, or 308, however, in some embodiments, the particular pattern 312 may merely be located in a non-functional component of the web-based response message 210 such as a comment or a spurious meta tag. In these embodiments, it is irrelevant whether web browser 38 sends back a web-based request message 212 including the particular pattern 312.

At step 140, which may be may be performed continuously in the background, (but, in some embodiments, at least a portion of the execution of step 140 follows step 128 or step 130), the network filter driver 40 monitors web-based messages exchanged between the web browser 38 and the web server 44. In some embodiments (corresponding to embodiments in which steps 120-128 are performed), only incoming web-based response messages are monitored by network filter driver 40. In other embodiments (corresponding to embodiments in which step 130 is performed), only outgoing web-based request messages are monitored by network filter driver 40. In other embodiments, both incoming web-based response messages and outgoing web-based request messages are monitored by network filter driver 40. It should be understood that while monitoring, the monitored web-based messages are not actually stopped by the network filter driver 40—the network filter driver 40 continues to pass the monitored web-based messages along the network driver stack 68 as usual. Thus, with reference to FIG. 4 the network filter driver 40 forwards 214 the web-based request message 212 up the network driver stack 68 on towards the web server 44.

In step 150, network filter driver 40 searches all monitored web-based messages for the presence of the particular pattern 312. In some embodiments, particularly corresponding to embodiments in which step 130 is performed, the entirety of each monitored web-based message is searched for the particular pattern 312. In other embodiments, network filter driver 40 smartly searches for the particular pattern 312 only within portions of the monitored web-based messages that are expected to contain the particular pattern 312 (e.g., within elements 302-308).

In some embodiments, the particular pattern 312 is a portion of a resource identifier (RI). An RI is an element that identifies a particular resource with particularity, such as, for example, a full or absolute URI or uniform resource locator (URL) 310 within an HTML page, a relative URI or URL 310 within an HTML page, or a request-URI 330 within an HTTP header. In some embodiments, the particular pattern 312 is the entire RI, while in other embodiments, it is merely located within an RI, the RI also including other elements. For example, if the RI is the absolute URI 310 as depicted in FIG. 5, <http://www.connected.com/AMWS/ChangeSettings-success.html?hash=0x12345678>, then the particular pattern 312 might be "AMWS/ChangeSettings-success.html?hash=" as shown, while the base portion—"http://www.connected.com/"—of the of the absolute URI 310 and the trailing portion—"0x12345678"—are excluded from the particular pattern 312.

When network filter driver 40 detects the particular pattern 312 within a monitored message, it proceeds to step 160.

In step 160, client 32 evaluates the monitored web-based message in which the particular pattern 312 was detected to determine whether the set of server settings 48 has changed. This step may be performed by the network filter driver 40 sending a portion 216 of that monitored web-based message (or, in some embodiments, simply a command) to the backup application 42 (or, in other embodiments, some other locally-running system service) for further evaluation, followed by the backup application 42 determining whether that monitored web-based message indicates that the set of server settings 48 has changed.

Backup application 42 may determine whether that monitored web-based message has changed by performing evaluation operations 218 in one of several ways.

In one embodiment, backup application 42 determines that the monitored web-based message has changed by communicating with the backup server 46 to obtain the current version 222 of the set of server settings 48 (for example, by using the SOAP protocol, as mentioned previously, to send a request 220 for the updated settings) and then comparing the received current version 222 of the set of server settings 48 to the local version 74 of the set of server settings 48. This may be done because, in some embodiments, the web server 44, while executing the various local operations 208 may also only proceed to sending the RI within the web-based response message 210 if it determines that the set of server settings 48 has actually changed. Alternatively, the backup application 42 may use this procedure since it is simple to execute.

In other embodiments, backup application 42 determines that the monitored web-based message has changed by evaluating the hash 320. This evaluation may be done by comparing the hash 320 to a locally-stored hash of the local version

74 of the set of server settings 48. This locally-stored hash may have been stored the previous time the set of server settings 48 were updated. Alternatively, a test hash may be computed based on the local version 74 of the set of server settings 48, compared to the received hash 320, and then discarded. It should be understood that the backup application 42 computes the test hash using the same algorithm that the web server 44 or the backup server 46 uses when performing the various local operations 208.

Once the backup application 42 determines that the set of server settings 48 has changed, it proceeds to step 170, in which it updates the local version 74 of the set of server settings 48 in memory 66. In embodiments in which the backup application 42 has not yet communicated with the backup server 46 to obtain the current version 222 of the set of server settings 48, it now proceeds to communicate with the backup server 46 to obtain the current version 222 of the set of server settings 48 (for example, by using the SOAP protocol, as mentioned previously, to send a request 220 for the updated settings). Once the backup application 42 has received the current version of the set of server settings 48, it stores the received current version 222 of the set of server settings 48 as a replacement local version 74 of the set of server settings 48 in memory 66 by performing a storage operation 224.

Figure 6:
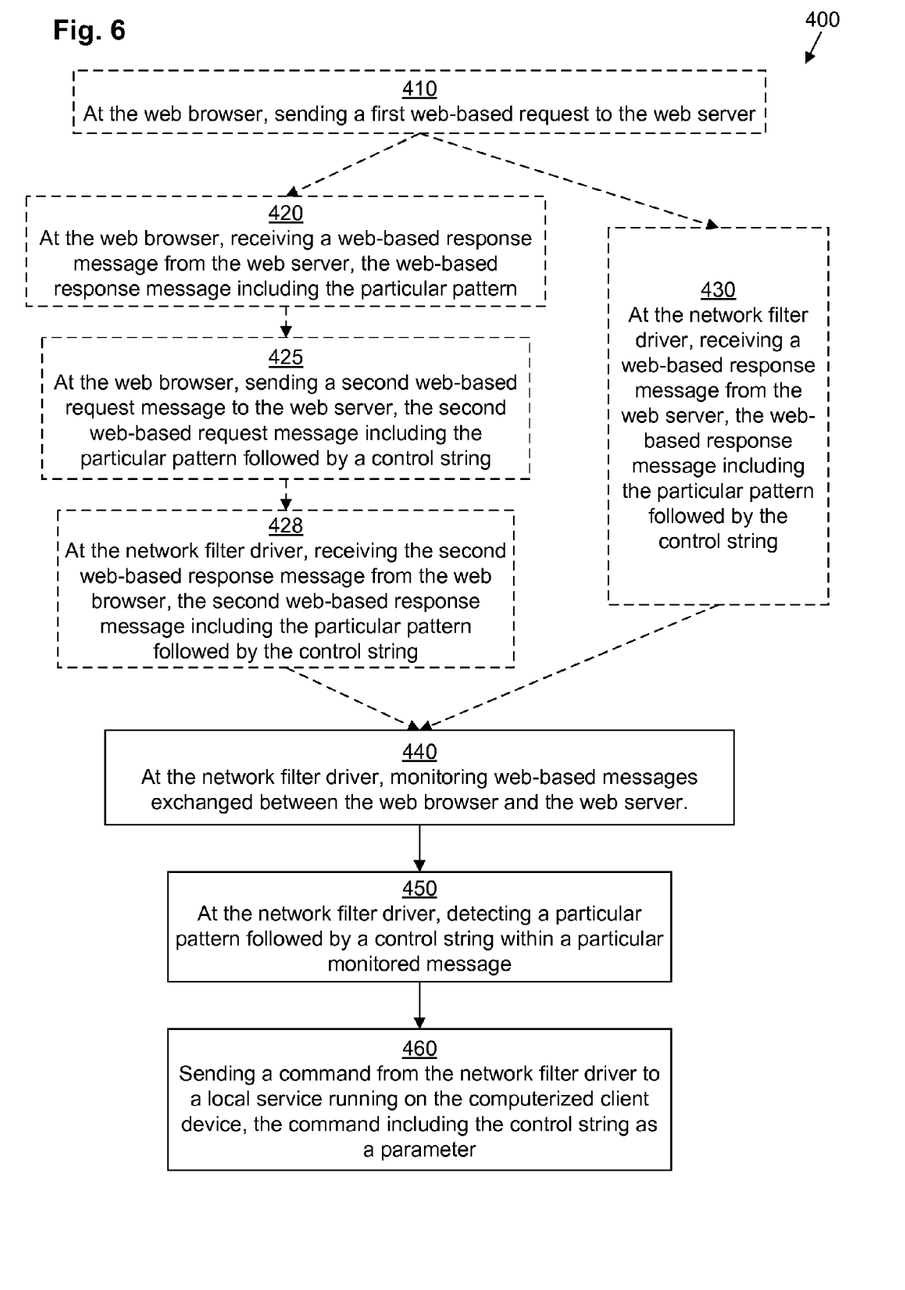
FIG. 6 illustrates an example method of various embodiments.

FIG. 6 depicts another example method 400 according to various other embodiments. Method 400 includes optional steps 410-430, followed by steps 440-460, as depicted. It should be understood that, although various software components are described as performing various of the steps of method 400 (meaning that a processor performs these steps via execution of code contained within that software), this is by way of example only. In fact, in some embodiments, the steps of method 400 are actually performed in dedicated hardware, while, in other embodiments, the steps are performed within different modules than as described.

In step 410, web browser 38 sends a first web-based request message to the web server 44.

In one embodiment, operation then passes on to step 420. In step 420, the web browser 38 receives the web-based response message 210 from the web server 44 (via network driver stack 68). In step 425, web browser 38 responds by sending a second web-based request message 212 to the web server 44 via the network driver stack 68.

After step 425, operation passes on to step 428, in which network filter driver 40 receives the second web-based request message 212 from the web browser 38, the second web-based request message 212 including the particular pattern 312 followed by a control string (e.g., value 320).

In some embodiment, operation passes on to step 430 instead of steps 420-428 after performing step 410. In step 430, the network filter driver 40 receives the web-based response message 210 from the web server 44, the web-based response message 210 including the particular pattern 312 followed by a control string.

At step 440, which may be may be performed continuously in the background, (but, in some embodiments, may follow step 428 or step 430), the network filter driver 40 monitors web-based messages exchanged between the web browser 38 and the web server 44. In some embodiments (corresponding to embodiments in which steps 420-428 are performed), only incoming web-based response messages are monitored by network filter driver 40. In other embodiments (corresponding to embodiments in which step 430 is performed), only outgoing web-based request messages are monitored by network filter driver 40. In other embodiments, both incoming web-based response messages and outgoing web-based request messages are monitored by network filter driver 40.

In step 450, network filter driver 40 searches all monitored web-based messages for the presence of the particular pattern 312. In some embodiments, particularly corresponding to embodiments in which step 430 is performed, the entirety of each monitored web-based message is searched for the particular pattern 312. In other embodiments, network filter driver 40 smartly searches for the particular pattern 312 only within portions of the monitored web-based messages that are expected to contain the particular pattern 312 (e.g., within elements 302-308).

In some embodiments, the particular pattern 312 is a portion of an RI, the RI also including other elements. For example, if the RI is the absolute URI 310 as depicted in FIG. 5, <http://www.connected.com/AMWS/ChangeSettings-success.html?hash=0x12345678>, then the particular pattern 312 might be "AMWS/ChangeSettings-success.html?hash=" as shown, while the base portion—"http://www.connected.com/"—of the of the absolute URI 310 and the trailing portion—"0x12345678"—are excluded from the particular pattern 312, the trailing portion 320—"0x12345678"—being interpreted as the control string.

When network filter driver 40 detects the particular pattern 312 and a control string within a monitored message, it proceeds to step 460.

In step 460, network filter driver 40 sends a command including the control string as a parameter to a locally-running service running on the client 32.

In one embodiment, method 400 may be performed in the context of a user attempting to retrieve a backed up file from the backup server 46. Thus, within step 410, the user may interface with web browser 44 to navigate to a page that allows the user to select a particular file to retrieve. The web server 44, in either step 420 or 430, may then respond by sending back web-based response message 210 with the particular pattern 312 and a control string that identifies the particular file. In step 450, the network filter driver 40 determines that a file retrieval should be initiated, so, in step 460, it sends a file retrieval command to backup application 42 with the control string as a parameter to identify the file. Backup application 42 can then initiate a file retrieval operation for the file identified by the control string. This is beneficial because the backup application 42 can smartly download the file from backup server 46, allowing for interrupted retrievals to be smoothly continued. Thus, even if the client 32 crashes during the file retrieval, backup application 42 can be configured to continue all pending file retrieval operations as soon as backup application 42 is re-launched. Alternatively, the user could attempt to retrieve the file again, by performing step 410 again. When the backup application 42 eventually receives the command with the control string, it can identify that the file identified by the control string has already been partially retrieved, and then communicate with the backup application 46 to resume retrieval smartly.

Thus, embodiments have been provided for propagating changes from a server device 36 to a client device 32 without long latency periods and without unnecessarily wasting system and network resources by making use of a network filter driver 40 configured to monitor network traffic for a signature pattern 312.

While various embodiments of the invention have been particularly shown and described, it will be understood by those skilled in the art that various changes in form and details may be made therein without departing from the spirit and scope of the invention as defined by the appended claims.

It should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "background," as "prior art," or as "conventional," Applicants make no admission that such technique, method, apparatus, or other concept is actually prior art under 35 U.S.C. §102 or §103, such determination being a legal determination that depends upon many factors, not all of which are known to Applicants at this time.

What is claimed is:

1. In a computerized client device, a method of synchronizing settings with a remote server device, the method comprising:
    monitoring web-based messages exchanged between the computerized client device and the remote server device across a network;
    detecting a pre-defined pattern within a resource identifier (RI) field of a particular message of the monitored web-based messages exchanged between the computerized client device and the remote server device, wherein the RI field of the particular message includes both the pre-defined pattern and a received hash value;
    in response to detecting the pre-defined pattern within the RI field of the particular message, evaluating the particular message to determine whether a set of server settings has changed by:
    comparing the received hash value to a locally-stored hash value; and
    in response to the locally-stored hash value equaling the received hash value, determining that the particular message indicates that the set of server settings has not changed;
    otherwise, determining that the particular message indicates that the set of server settings has changed; and
    in response to determining that the set of server settings has changed, updating a local version of the set of server settings.

2. The method of claim 1 wherein:
    a web browser, a network filter driver within a network driver stack, and a local service to communicate with the remote server device are running on the computerized client device;
    the web-based messages are exchanged between the web browser and a web server running on the remote server device;
    monitoring the web-based messages is performed by the network filter driver, running on the computerized client device;
    detecting the pre-defined pattern is performed by the network filter driver, running on the computerized client device; and
    evaluating the particular message to determine whether the set of server settings has changed includes:
        at the network filter driver, running on the computerized client device, sending the particular message to the local service for evaluation; and
        at the local service, running on the computerized client device, determining whether the particular message indicates that the set of server settings has changed.

3. The method of claim 2 wherein updating the local version of the set of server settings includes:
    if the particular message indicates that the set of server settings has changed, then, at the local service:
        communicating with the remote server device across the network to obtain the set of server settings; and
        locally storing the obtained set of server settings as the local version of the set of server settings; and
    otherwise, refraining from communicating with the remote server device across the network to obtain the set of server settings.

4. The method of claim 3 wherein:
    the received hash value is located after the pre-defined pattern within the RI field of the particular message, and wherein
    sending the particular message to the local service for evaluation includes sending the hash value to the local service.

5. The method of claim 2 wherein determining whether the particular message indicates that the set of server settings has changed includes:
    communicating with the remote server device across the network to obtain the set of server settings; and
    comparing the obtained set of server settings to the local version of the set of server settings.

6. The method of claim 5 wherein detecting the pre-defined pattern within the particular message includes detecting that the resource identifier (RI) field of the particular message is identical to the pre-defined pattern.

7. The method of claim 2 wherein:
    monitoring the web-based messages includes:
        receiving web-based requests from the web browser directed to the web server running on the remote server device from the network driver stack;
        extracting a resource identifier (RI) field of each received web-based request; and
        sending the web-based requests back to the network driver stack; and
    detecting the pre-defined pattern within the particular message includes detecting the pre-defined pattern within the extracted RI field of the particular message, contents of the extracted RI field having previously been provided to the web browser by the remote server device.

8. The method of claim 7 wherein the method further includes:
    at the web browser, sending a set of setting changes to the web server running on the remote server device;
    in response to sending the set of setting changes, receiving from the web server running on the remote server device, at the web browser, a web-based response message, the web-based response message including a redirect command, the redirect command including the contents of the extracted RI field; and
    in response to receiving the web-based response message, sending the particular message from the web browser to the remote server device via the network driver stack, the particular message including the extracted RI field, and the particular message being a web-based request for a page identified by the contents of the extracted RI field.

9. The method of claim 7 wherein the method further includes:

at the web browser, sending a set of setting changes to the web server running on the remote server device;

in response to sending the set of setting changes, receiving from the web server running on the remote server device, at the web browser, a confirmation page, the confirmation page including an embedded element, the embedded element having an address attribute set to include the contents of the extracted RI field; and in response to receiving the confirmation page, sending the particular message from the web browser to the remote server device via the network driver stack, the particular message including the extracted RI field, and the particular message being a web-based request for an element identified by the contents of the extracted RI field.

10. The method of claim 9 wherein:

receiving the confirmation page includes receiving the confirmation page across a secured HTTPS connection, the address attribute of the embedded element being an unsecured HTTP uniform resource identifier; and sending the particular message from the web browser to the remote server device includes sending a GET request for the extracted RI field across an unsecured HTTP connection.

11. The method of claim 2 wherein:

monitoring the web-based messages includes:

receiving web-based response messages from the web server running on the remote server device directed to the web browser from the network driver stack;

extracting a resource identifier (RI) field of each received web-based response message; and sending the web-based response messages back to the network driver stack; and detecting the pre-defined pattern within the particular message includes detecting the pre-defined pattern within the extracted RI field of the particular message.

12. The method of claim 2 wherein:

the local service is a backup application to perform backup of local files to a backup server application running on the remote server device, the backup server application storing the set of server settings on the remote server device to direct the operation of the backup server application; and the method further includes, at the web browser, sending, to the web server running on the remote server device, a set of changes to the set of server settings.

13. The method of claim 12 wherein the set of changes to the set of server settings includes one or more settings selected from the group consisting of:

a choice of what files to backup;
a choice of what folders to backup;
a choice of what devices to backup;
a choice of what devices to exclude from backup;
a choice of what folders to exclude from backup;
a choice of what files to exclude from backup;
a choice of when to perform periodic backups; and
a choice of how often to perform periodic backups.

14. A non-transitory computer readable medium that stores instructions, which, when executed by a computer, cause the computer to:

monitor web-based messages exchanged across a network between a web browser operating on the computer and a web server running on a remote server device;

detect a pre-defined pattern within a resource identifier (RI) field of a particular message of the monitored web-based messages exchanged between the web browser operating on the computer and the web server running on the remote server device, wherein the RI field of the particular message includes both the pre-defined pattern and a received hash value; and in response to detecting the pre-defined pattern within the particular message, send the particular message to a local service for evaluation of the particular message to determine whether a set of server settings has changed includes instructions to:

compare the received hash value to a locally-stored hash value; and in response to the locally-stored hash value equaling the received hash value, determine that the particular message indicates that the set of server settings has not changed;

otherwise, determine that the particular message indicates that the set of server settings has changed.

15. The non-transitory computer readable medium of claim 14 wherein the instructions, when executed by the computer further cause the computer to:

detect that the resource identifier (RI) field of the particular message includes both the pre-defined pattern and the received hash value, the received hash value being located after the pre-defined pattern within the RI field of the particular message; and send the hash value to the local service.

16. The non-transitory computer readable medium of claim 14 wherein the instructions, when executed by the computer further cause the computer to detect that the resource identifier (RI) field of the particular message is identical to the pre-defined pattern.

17. The non-transitory computer readable medium of claim 14 wherein the instructions, to monitor the web-based messages and when executed by the computer further cause the computer to:

receive web-based requests from the web browser directed to the web server running on the remote server device from a network driver stack;

extract a resource identifier (RI) field of each received web-based request; and send the web-based requests back to the network driver stack; and detect the pre-defined pattern within the extracted RI field of the particular message, contents of the extracted RI field having previously been provided to the web browser by the remote server device.

18. The non-transitory computer readable medium of claim 14 wherein the instructions, to monitor the web-based messages and when executed by the computer further cause the computer to:

receive web-based response messages from the web server running on the remote server device directed to the web browser from a network driver stack;

extract a resource identifier (RI) field of each received web-based response message; and send the web-based response messages back to the network driver stack; and detect the pre-defined pattern within the extracted RI field of the particular message.

19. An apparatus comprising:

a network interface for communicating with a remote server device across a network;

a processor; and a memory on which is stored machine readable instructions that are to cause the processor to:

monitor web-based messages exchanged across the network between a web browser operating on the apparatus and a web server running on the remote server device for a pre-defined pattern within a resource identifier of the monitored web-based messages;

detect the pre-defined pattern within a particular message of the monitored web-based messages exchanged between the web browser operating on the apparatus and the web server running on the remote server device, wherein the RI field of the particular message includes both the pre-defined pattern and a received hash value; and in response to detecting the pre-defined pattern within the particular message, evaluate the particular message to determine whether a set of server settings has changed includes machine readable instructions that are to further cause the processor to:

compare the received hash value to a locally-stored hash value; and in response to the locally-stored hash value equaling the received hash value, determine that the particular message indicates that the set of server settings has not changed;

otherwise, determine that the particular message indicates that the set of server settings has changed; and in response to determining that the set of server settings has changed, update a local version of the set of server settings.

20. In a computerized client device, a method of receiving a command from a remote server device, the method comprising:

at a network filter driver of a network driver stack, monitoring web-based messages exchanged between a web browser running on the computerized client device and a web server running on the remote server device across a network for a pre-defined pattern within a resource identifier (RI) field of the monitored web-based messages;

at the network filter driver, detecting the pre-defined pattern followed by a control string within a particular message of the monitored web-based messages exchanged between the web browser and the web server, wherein the RI field of the particular message includes both the pre-defined pattern and a received hash value; and in response to detecting the pre-defined pattern followed by the control string within the particular message, sending a command from the network filter driver to a local service running on the computerized client device, the command including the control string as a parameter, evaluating , by the local service, the particular message to determine whether a set of server settings has changed by:

comparing the received hash value to a locally-stored hash value; and in response to the locally-stored hash value equaling the received hash value, determining that the particular message indicates that the set of server settings has not changed;

otherwise, determining that the particular message indicates that the set of server settings has changed.

* * * * *